(12) United States Patent
Shoavi

(10) Patent No.: US 7,593,160 B2
(45) Date of Patent: Sep. 22, 2009

(54) METHOD OF COMPACTING OPTICAL SYSTEMS COMPRISING MULTIPLE OPTICAL CHANNELS INTO CONFINED SPACES

(75) Inventor: Ehood Shoavi, Misgav (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 34 days.

(21) Appl. No.: 11/788,706

(22) Filed: Apr. 20, 2007

(65) Prior Publication Data

US 2008/0121786 A1   May 29, 2008

(30) Foreign Application Priority Data

Apr. 27, 2006  (IL) .................................... 175277

(51) Int. Cl.
*G02B 27/10* (2006.01)
(52) U.S. Cl. .......................... 359/618; 359/629; 353/31
(58) Field of Classification Search ................. 359/618, 359/629, 634, 636, 350; 369/112.17, 112.19, 369/112.21, 110.02, 124.03; 356/500, 509, 356/520; 250/201.5, 201.7, 216, 225; 353/31; 352/84; 396/336; 346/107.2
See application file for complete search history.

(56) References Cited

U.S. PATENT DOCUMENTS

| | | | | |
|---|---|---|---|---|
| 3,521,068 A * | 7/1970 | Smith et al. | .................. | 398/102 |
| 5,192,982 A * | 3/1993 | Lapucci | ....................... | 356/520 |
| 5,193,025 A | 3/1993 | Carlson et al. | .............. | 359/356 |
| 5,892,749 A * | 4/1999 | Yamanaka | ............. | 369/112.17 |
| 6,149,276 A * | 11/2000 | Takeuchi et al. | .............. | 353/31 |
| 6,751,373 B2 * | 6/2004 | Jeong | .......................... | 385/24 |

\* cited by examiner

*Primary Examiner*—Loha Ben
(74) *Attorney, Agent, or Firm*—Ohlandt, Greeley, Ruggiero & Perle, L.L.P.

(57) ABSTRACT

The present invention is a method of compacting an optical system comprising multiple optical channels. The method comprises providing one or more beam splitters and a plane mirror located one after the other along the principal ray in order to divert split-off beams into separate optical channels. Each of the separate optical channels is arranged on a consecutive level perpendicular to the principal ray. This arrangement allows the optical system to occupy a minimal volume and to fit into a confined space.

3 Claims, 2 Drawing Sheets

METHOD OF COMPACTING OPTICAL SYSTEMS COMPRISING MULTIPLE OPTICAL CHANNELS INTO CONFINED SPACES

FIELD OF THE INVENTION

The present invention is in the field of the design of opto-mechanical systems. In particular the invention is a method of compacting optical systems comprising multiple optical channels into confined spaces.

BACKGROUND OF THE INVENTION

Optical designs are more often than not two dimensional and, when implemented, the various optic elements are located on flat surfaces, i.e. optic benches. For example, there are many applications for which it is necessary to split an incoming radiation beam into two or more components and to cause the components to follow different optical paths Each multi-channel optical arrangement is designed to fit a different set of conditions and must conform to requirements of space and weight in addition to providing the optical solution. A typical optical system is described in U.S. Pat. No. 5,193,025. In the system in this patent all of the optical elements are located in a single plane. However a planar layout of the optical elements is not always suitable for all situations, particularly if the system must be positioned in a relatively confined location.

It is therefore a purpose of the present invention to provide a systematic approach to compact to a minimum volume an optical system consisting of many optical channels.

Further purposes and advantages of this invention will appear as the description proceeds.

SUMMARY OF THE INVENTION

The present invention is a method of compacting an optical system comprising multiple optical channels. The method comprises one or more beam splitters and a plane mirror located one after the other along the principal ray in order to divert split-off beams into separate optical channels. Each of the separate optical channels is arranged on a consecutive level perpendicular to the principal ray. This arrangement allows the optical system to occupy a minimal volume and to fit into a confined space.

In a preferred embodiment of the invention, each level comprises:

(a) a detector;
(b) a beam splitter or a plane mirror; and
(c) optical elements whose function it is to steer and focus the beam of each channel onto the respective detector.

In different embodiments of the method of the invention, the split-off beam of each channel can have a different intensity or wavelength or both and the wavelength of each channel can be in one of the ultraviolet, visible, or infrared regions of the electromagnetic spectrum.

All the above and other characteristics and advantages of the invention will be further understood through the following illustrative and non-limitative description of preferred embodiments thereof, with reference to the appended drawings.

DETAILED DESCRIPTION OF PREFERRED EMBODIMENTS

The invention provides a systematic approach to the way that multi-channel optical elements should be assembled in order to occupy a minimal volume and fit into confined spaces.

Figure 1:
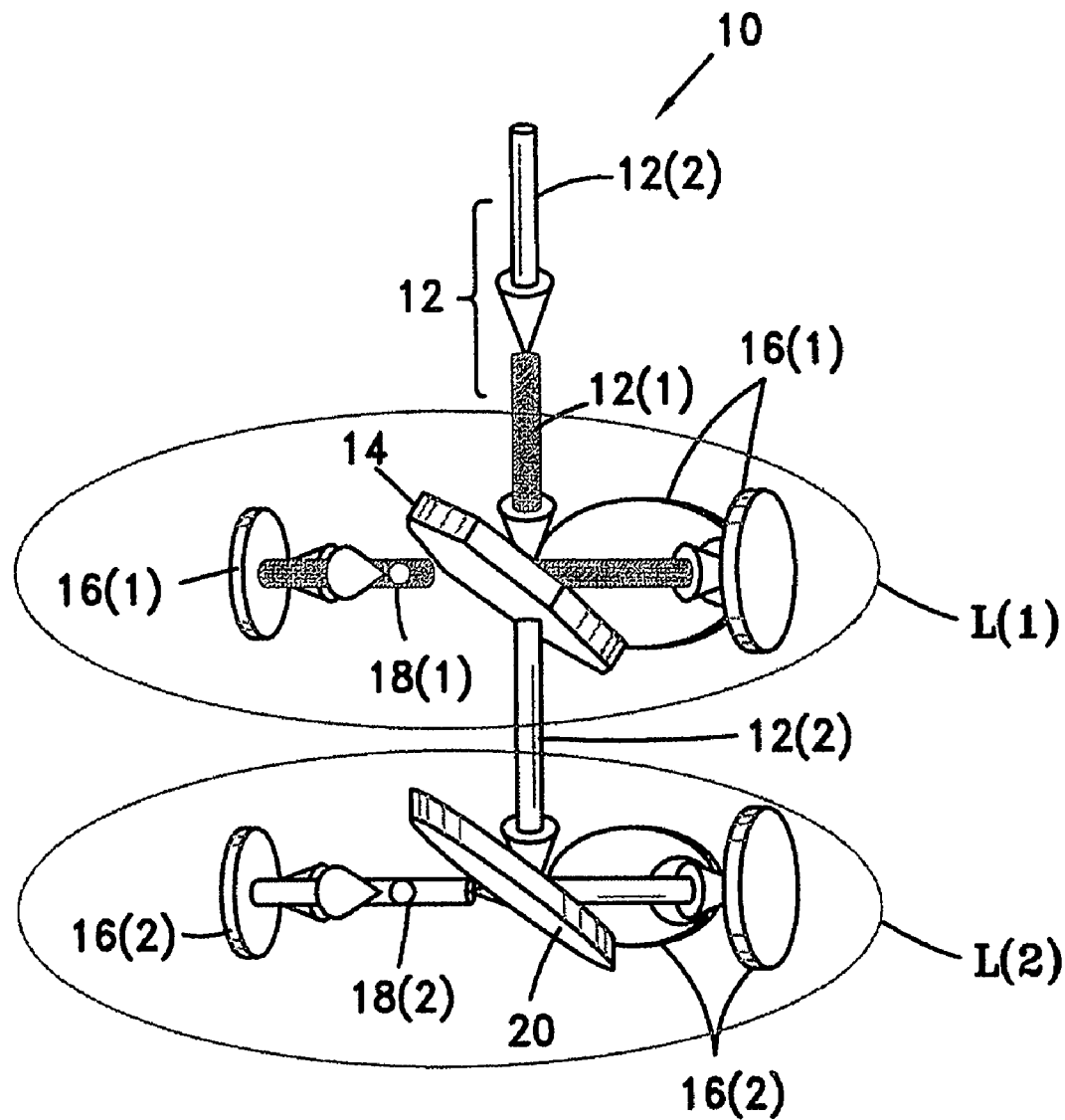
FIG. 1 is a schematic side view of the system of the invention.
Figure 2:
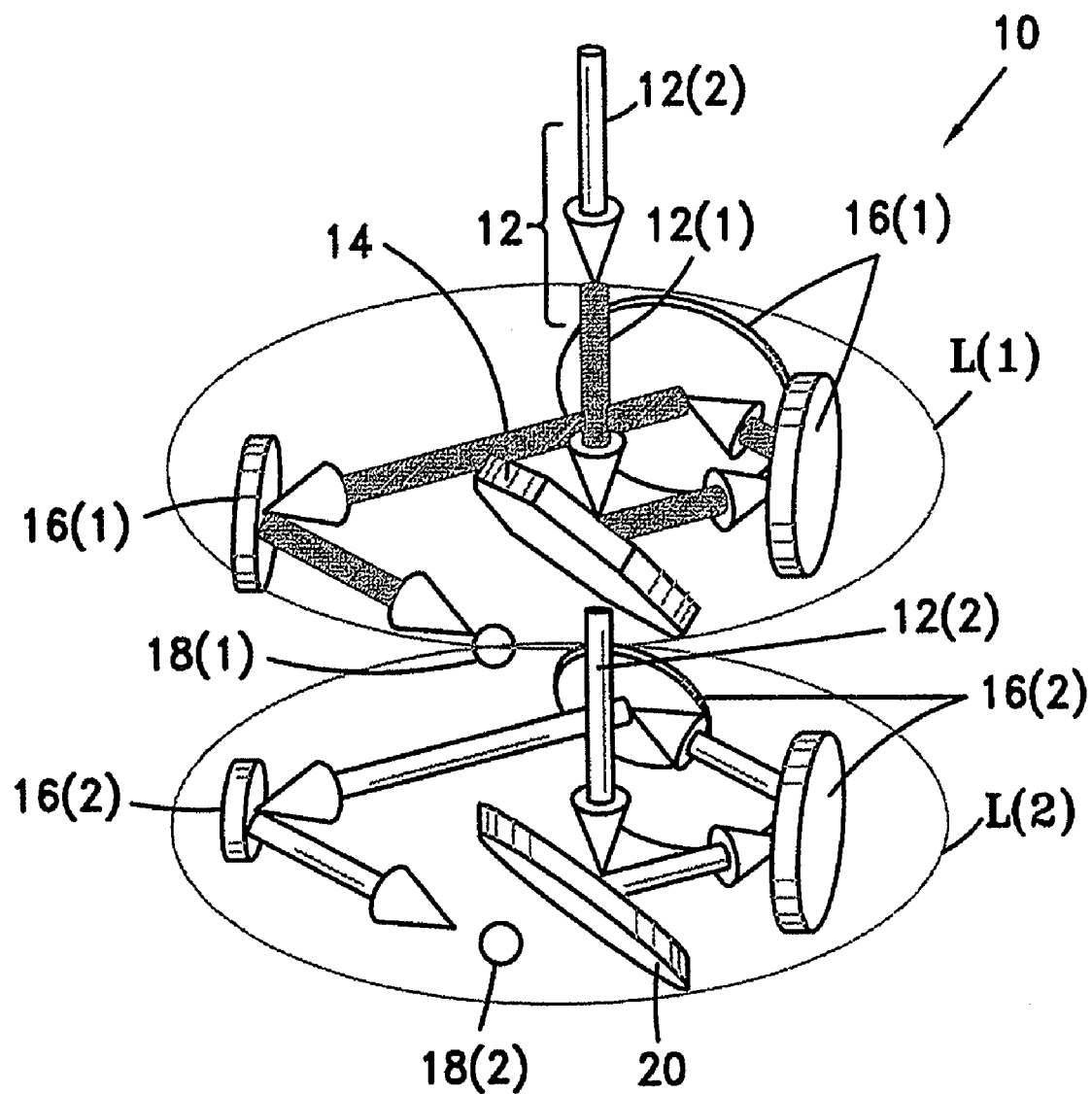
FIG. 2 is a schematic perspective view of the system shown in FIG. 1.

FIG. 1 and FIG. 2 show respectively schematic side and perspective views of an exemplary embodiment of the invention. The main feature of the system is that the principal ray (the main incoming beam) of light is split into two or more channels using one or more beam splitters and a plane mirror located along its path. At the location of each of the beam splitters and the plane mirror the split-off ray is diverted into an optical channel located on a level oriented perpendicularly to the direction of the principal ray. Reflecting elements cause the split beam to follow a specific path (a closed loop is preferred for minimum volume considerations) located in each respective level. Diffracting and other optic elements can be located between the reflecting surfaces according to the optical design. Following this method, using consecutive beam splitters and perpendicular levels, a compact optical design can be put together, which will fit into confined enclosures.

By the term "light" is meant any type of electromagnetic radiation, particularly radiation whose wavelength is in the ultraviolet, visible, and infrared regions. Each channel can have a different intensity or wavelength or both.

In the embodiment of the system 10 shown in the figures the incoming beam of light 12 is divided into two different wavelength bands 12(1) and 12(2). Each of levels L(1) and L(2) comprises a detector 18(1) and 18(2) that is sensitive to energy in the appropriate wavelength band. The upper level L(1) comprises a beam splitter 14 to separate the wavelengths 12(1) of the first channel from the remainder of the wavelengths 12(2) in the incoming beam (12). Wavelengths 12(2) pass through beam splitter 14 and impinge upon plane mirror 20 in the second level L(2). The two beams are directed by beam splitter 14 and plane mirror 20 toward the optical elements 16(1) and 16(2) whose function it is to steer and focus the beam of each channel onto the detector 18(1) and 18(2) respectively.

The exact number, properties, and configuration of optical elements 16(1) and 16(2) are dependent on the specific requirements of the application and can be different in the different channels. The optical layout for each channel is not a part of the present invention. In the figures are shown only reflective optical elements, with the exception of the beam splitter 14. The use of reflective elements is generally preferable to minimize energy losses; however, diffractive optical elements can also be used, providing that they transmit the wavelengths of the channel in which they are used.

An embodiment with three or more layers can be created mutatis mutandis by replacing mirror 20 with a beam splitter. The practical limitation on the number of channels of which the system can be composed is that each beam splitter must reflect into its respective channel enough energy to be detected with an acceptable signal-to-noise ration.

Although embodiments of the invention have been described by way of illustration, it will be understood that the invention may be carried out with many variations, modifications, and adaptations, without departing from its spirit or exceeding the scope of the claims.

The invention claimed is:

1. A method of compacting an optical system comprising multiple optical channels, said method comprising providing one or more beam splitters and a plane mirror located one after the other along a principal ray of light in order to divert split-off beams of light into separate optical channels, each channel arranged on a consecutive level perpendicular to said principal ray, thereby allowing said optical system to occupy a minimal volume and to fit into a confined space;
 wherein each level comprises:
 a detector;
 a beam splitter or a plane mirror; and
 optical elements each adapted to steer and focus the beam of each channel onto the respective detector.

2. A method according to claim 1, wherein the split-off beam of each channel can have a different intensity or wavelength or both.

3. A method according to claim 1, wherein each optical channel can be adapted to detect a beam of light in one of the ultraviolet, visible, or infrared regions of the electromagnetic spectrum.

* * * * *